United States Patent [19]

Moore et al.

[11] Patent Number: 4,921,892

[45] Date of Patent: May 1, 1990

[54] SETTING ASPHALT EMULSIONS

[75] Inventors: Richard B. Moore, Richmond, Tex.;
Paul L. Fitzgerald, Hixson, Tenn.;
Ernest G. Pole, Sarnia, Canada

[73] Assignee: BASF Aktiengesellschaft,
Ludwigshafen, Fed. Rep. of
Germany

[21] Appl. No.: 102,840

[22] Filed: Sep. 30, 1987

[51] Int. Cl.$^5$ ............................................... C08L 95/00
[52] U.S. Cl. ...................................... 524/61; 524/60;
524/66
[58] Field of Search ..................... 524/60, 61; 106/277

[56] References Cited

U.S. PATENT DOCUMENTS

| | | | |
|---|---|---|---|
| 3,345,324 | 10/1967 | Bristol et al. | 524/60 |
| 3,359,229 | 12/1967 | Chabex et al. | 524/61 |
| 3,835,117 | 9/1974 | Walaschek . | |
| 3,897,380 | 7/1975 | Walaschek . | |
| 3,904,558 | 9/1975 | Graham et al. | 524/156 |
| 4,193,816 | 3/1980 | Ferm et al. | 106/283 |
| 4,214,053 | 7/1980 | Porter | 428/95 |
| 4,351,750 | 9/1982 | Ferm et al. | 524/60 |
| 4,544,690 | 10/1985 | Ladish . | |
| 4,657,595 | 4/1987 | Russel | 106/277 |
| 4,731,399 | 3/1988 | Fitzgerald et al. | 524/60 |

FOREIGN PATENT DOCUMENTS

| | | | |
|---|---|---|---|
| 2829377 | 4/1979 | Fed. Rep. of Germany | 524/60 |
| 145165 | 9/1982 | Japan | 524/60 |
| 2104866 | 5/1987 | Japan | 524/61 |
| 469 | 2/1982 | PCT Int'l Appl. | 524/60 |

OTHER PUBLICATIONS

Chemical Abstracts, vol. 91, No. 91:8832x, Asphalt and Asphalt-Rubber Insulants (1979), Macha et al.
Chemical Abstracts, vol. 96, No. 96:39864s, Hardening Type Waterproofing Process, Japan Latex, Kako K. K.
Chemical Abstracts, vol. 96, No. 96:163961k, Setting a Latex of a Film-Forming Polymer, (1982), Wilson.
Chemical Abstracts, vol. 81, No. 171549n, Bitumen Emulsion Coating Compositions, (1974), Rambelli.
Tech Book Facts Pliopave Latex for Bitumen Modification, The Goodyear Tire & Rubber Company.

*Primary Examiner*—John C. Bleutge
*Assistant Examiner*—David W. Woodward
*Attorney, Agent, or Firm*—Bruce E. Harang

[57] ABSTRACT

Anionic Emulsions of asphalt, bitumen, or tar which may optionally contain a latex of a rubbery polymer may be set using a destablizing system comprising either an alkali silicofluoride in the presence of a sulfamate or a mixture of an amine in the presence of a divalent metal ion. The setting time for such emulsions can be reduced to less than half an hour.

6 Claims, No Drawings

SETTING ASPHALT EMULSIONS

FIELD OF THE INVENTION

The present invention relates to the destabilization of emulsions of asphalt, bitumen or coal tar which are stabilized with emulsifiers which become insoluble or are significantly reduced in activity at pH's less than about 7.5 preferably less than 7.0, or in the presence of divalent metal ion-amine complexes.

BACKGROUND OF THE INVENTION

Emulsions of asphalt, bitumen and coal tar have a wide range of uses including binders for roads, water barriers for sub-surface foundations of a building, and saturants for webs such as glass or polyester to make water proof webs which may be cut into shingles. In many of these applications it is desired to cause the emulsion of asphalt, bitumen or coal tar to destablize so that the asphalt, bitumen or coal tar sets and does not flow. This is particularly important in highway construction where the highway is closed until the asphalt, bitumen or coal tar emulsion is set to prevent damage and accidents which may be caused by stones or unbroken emulsion thrown up by traffic. One particular concern is the potential for breaking car windshields.

It is also desired to improve the water resistance of materials made from such emulsions of asphalt, bitumen and coal tar. This is particularly important in roofing applications.

There are a number of references which teach that emulsions of asphalt, bitumen or coal tar may be gelled or set using alkali metal silicofluorides. This art is represented by Chemical Abstract 91:8832 of Czech Pat. No. 176,308 issued Feb. 15, 1979; Chemical Abstract No. 96:39864S of Japanese Pat. No. 39,352 issued Sept. 12, 1981; Chemical Abstract No. 96:163961 of E.P. Application No. 45,619 published Feb. 10, 1982; and Chemical Abstract No. 81:171549n of German Offen. No. 2,363,085 published July 4, 1974.

Unfortunately, asphalt emulsions have a very narrow tolerance to alkali metal silicofluorides. Thus, the silicofluoride must be provided within a very precise limit. If too little is provided, the emulsion will destablize too slowly; and if too much is used, the emulsion will set too fast. This will not permit the emulsions to be worked. There is a need to develop a system which provides a greater tolerance to destabilization of asphalt, bitumen and or tar emulsions.

Additionally, the silicofluoride agents are time delay gelling agents. That is, the agent will cause the emulsion to destabilize a relatively short time after the silicofluoride is added to the asphalt emulsion. Generally the silicofluoride must be post added to the emulsion. There is a need for a new type of destabilizer which provides for a longer pot life.

The present invention seeks to address these problems.

SUMMARY OF THE INVENTION

The present invention provides a process for destabilizing an anionic emulsion of one or more members selected from the group consisting of asphalt, bitumen, and coal tar, said emulsion being stabilized with an emulsifier which becomes insoluble at pH's less than about 7.5 or in the presence of amine-divalent metal complexes, which comprises contacting per 100 parts by dry weight of said emulsion with a destabilization system selected from the group consisting of:

(a) at least about 0.1 parts by weight of a metal or ammonium silicofluoride and from about 0.05 to 10 parts by weight of one or more members selected from the group consisting of ammonium sulfamate, ammonium sulfate, $C_{1-8}$ alkyl, and hydroxyalkyl amines and sulfamates, $C_{1-8}$ alkyl and hydroxyalkyl amine sulfates and ammonium salts of $C_{1-6}$ aliphatic carboxylic acids; and (b) at least about 0.5 parts dry weight of a compound which releases or produces a divalent metal ions and a sufficient amount of an ammonia or ammonium ion releasing compound to provide at least 0.05 parts dry weight of ammonia or ammonium ion.

The present invention also provides: a composition comprising per 100 parts by dry weight of an anionic emulsion of one or more materials selected from the group consisting of asphalt, bitumen and coal tar, said emulsion being stabilized with an anionic stabilizer which becomes insoluble at pH's less than about 7.5 or in the presence of an amine-bivalent metal complex up to 50 parts by dry weight of one or more polymers or latices of polymers, provided said latex is stabilized with an emulsifier which becomes insoluble at a pH of less than about 7.5 or in the presence of divalent metal ion-amine complexes, said polymer being selected from the group consisting of:

(a) polymers comprising:
  (i) from 80 to 20 weight percent of a $C_{8-12}$ vinyl or vinylidene aromatic monomer which may be unsubstituted or substituted by a $C_{1-4}$ alkyl radical or a chlorine atom; and
  (ii) from 20 to 80 weight percent of a $C_{4-6}$ conjugated diolefin which may be unsubstituted by a chlorine atom;

(b) polymers comprising:
  (i) homopolymers or copolymers of $C_{4-6}$ conjugated diolefins which may be unsubstituted or substituted by a chlorine atom;

(c) polymers comprising:
  (i) from about 5 to 40 weight percent of a $C_{2-8}$ alkenyl nitrile., and
  (ii) from about 95 to 60 weight percent of a $C_{4-6}$ conjugated diolifin;

(d) polymers comprising:
  (i) from about 5 to 40 weight percent of a $C_2$ or 3 olefin; and
  (ii) from about 95 to 60 weight of one or more monomers selected from the group consisting of $C_{2-8}$ alkenyl esters of $C_{1-8}$ saturated carboxylic acids, and $C_{1-8}$ alkyl or hydroxyalkyl esters of $C_{3-8}$ ethylenically unsaturated carboxylic acids; and (e) polymers comprising:
  (i) co or homo polymers of $C_{1-8}$ alkyl or hydroxyalkyl esters of $C_{3-8}$ ethylenically unsaturated carboxylic acids; and a destabilizing agent selected from the group consisting of:

(a) 0.1 to 3 parts dry weight of an alkali metal silicofluoride and 0.1 to 5 parts of one or more members consisting of ammonium sulfamate, $C_{1-4}$ alkyl amine sulfamates and ammonium salts of $C_{1-6}$ aliphatic carboxylic acids; and (b) at least 0.5 dry parts of a compound which releases or produces a divalent metal ions and a sufficient amount of an ammonia or ammonium releasing compound to provide at least 05 parts by weight of ammonia or ammonium ion.

DETAILED DESCRIPTION

The emulsions which may be treated in accordance with the present invention are emulsions of asphalt, bitumen or coal tar. The asphalt may be a naturally occurring asphalt such as Trinidad Lake Asphalt, or it may be partly refined. The asphalt may be air blown or extracted to have the required penetration and ductility. The asphalt, bitumen or tar may also be softened by blending with softer asphalts, or oils or plasticizers. The asphalt, bitumen or tar may also be modified with dry polymer prior to formation of an emulsion. Suitable grade(s) of bitumen or coal tar may also be used in accordance with the present invention. The asphalt, bitumen or tar may have a penetration from 25 to 300 at 77° F.

The emulsion may be purchased or prepared in a conventional manner using a colloid mill or other suitable emulsifying techniques. The emulsifier or stabilizer should be anionic and should become insoluble or have a significantly reduced activity at pH's of less than about 7.5 preferably less than 7.0, or in the presence of divalent metal ion - amine complexes. Suitable emulsifiers include soaps of $C_{12-18}$ long chain fatty acids or oils, rosin, hydrogenated rosins and tall oil. Generally, the emulsifier will be present in an amount from about 0.1 to 10, preferably 0.25 to 2 weight percent based on the wet weight of the emulsion. The emulsion will generally contain up to 90, most preferably 55 to 75 weight percent of asphalt, bitumen or tar and at least 10, most preferably 45 to 25 weight percent of water. Preferably, the emulsion will be rapid setting (RS) or medium setting (MS), however, slow setting emulsions may also be used in accordance with the present invention. This is particularly true where improved water resistance is desired rather than rapid setting.

The emulsions used in accordance with the present invention may further optionally contain up to about 50 preferably about 35, most preferably 1-15, parts by dry weight of a polymer. The polymer may be added dry, or as a solution. In some cases the polymer may be added to the asphalt, bitumen or tar prior to making the emulsion. Most preferably the polymer is added to the asphalt bitumen or tar emulsion as an aqueous dispersion or latex. If the polymer is added as a latex, it should be stabilized with a surfactant system similar in charge and destabilization characteristics to those of the asphalt, bitumen or coal tar emulsion. That is, the emulsifier should be anionic, and one which becomes insoluble at pH's less than about 7.5 or in the presence of a divalent metal ion-amine complexes. Suitable emulsifiers have been discussed above.

Suitable polymers may be characterized as a styrene-butadiene (SB) polymers, polybutadiene polymers, acrylontrile-butadiene (NB) polymers, ethylene-vinyl acetate (EVA) polymers, acrylate polymers, natural rubber (NR) or polychloroprene polymers. Styrene butadiene type polymers comprise from about 80 to 20, preferably 60 to 40 weight percent of one or more $C_{8-12}$ vinyl or vinylidene aromatic monomers which may be unsubstituted or substituted by a $C_{1-4}$ alkyl radical or a chlorine atom; and from 20 to 80, preferably from 40 to 60 weight percent, one or more $C_{4-6}$ conjugated diolefins which may be unsubstituted or substituted by a chlorine atom.

Suitable $C_{8-12}$ vinyl or vinylidene aromatic monomers include styrene, and alpha methyl styrene. Suitable $C_{4-6}$ conjugated diolefins include butadiene, isoprene, and chloroprene. The polybutadiene type polymers are homo or co-polymers of $C_{4-6}$ conjugated diolefins which may be unsubstituted or substituted by a chlorine atom. Suitable diolefins have been discussed above. This group of polymers include latices of natural rubber and polychloroprene. The acrylonitrile butadiene type polymers comprise: from about 5 to 40, preferably about 15 to 35 weight percent of a $C_{2-8}$ alkenyl nitrile and., from about 95 to 60, preferably about 85 to 65 weight percent of a conjugated diolefin.

Suitable alkenyl nitriles include acrylonitrile (vinyl cyanide) and methacrylonitrile. Suitable conjugated diolefins include butadiene and isoprene.

Useful ethylene vinyl acetate type polymers comprise:

from about 5 to 40, preferably 10 to 30 weight percent of a $C_{2-3}$ olefin; and from about 95 to 60, preferably 90 to 70 weight percent of one or more monomers selected from the group consisting of $C_{2-8}$ alkenyl esters of $C_{1-8}$ saturated carboxylic acids and $C_{1-8}$ alkyl and hydroxyalkyl esters of $C_{3-8}$ ethylenically unsaturated carboxylic acids.

Ethylene and propylene are useful olefins. Suitable $C_{2-8}$ alkenyl esters of $C_{1-8}$ saturated carboxylic acids include vinyl acetate. Suitable $C_{1-8}$ alkyl and hydroxyalkyl esters of $C_{3-8}$ ethylenically unsaturated carboxylic acids include the esters of acrylic and methacrylic acids such as methyl acrylate, ethylacrylate, butyl acrylate, hydroxyethyl acrylate, ethylhexyl acrylate, and the methacrylate homologues of these esters.

Suitable acrylate type polymers include co or homo polymers of one or more esters of $C_{1-8}$ alkyl or hydroxyalkyl esters of $C_{3-8}$ ethylenically unsaturated carboxylic acids. Suitable esters have been discussed immediately above.

The polymers useful in the present invention may be a blend of the above polymers and up to about 20, preferably less than 15 weight percent of the above polymers which contain up to 15, preferably less than 5 weight percent of one or more functional monomers. The functional monomers may be $C_{3-6}$ ethylenically unsaturated carboxylic acids; $C_{1-8}$ alkyl and hydroxyalkyl esters of such acids; amides of such acids which may be unsubstituted or substituted at the nitrogen atom by up to two radicals selected from the group $C_{1-4}$ alkyl and hydroxyalkyl radicals; and $C_{3-6}$ ethylenically unsaturated carboxylic acids.

Suitable polymers are commercially available as latices with a polymer content up to about 75 weight percent. The average particle size of the polymer may vary from about 40 to 250 mu (400 to 2500 Å). Many latices have a polymer particle size from 120 to 250 mu (1200 to 2500 Å). In some applications it may be desirable to use a very small particle size from 60 to 100 mu (600 to 1000 Å) more preferably from 80-100 mu (800 to 1000 Å).

For example: Tech-Book Facts Pliopave ™ Latex for Bitumen Modification, published in the mid to late 1960's by the Chemical Division of The Goodyear Tire and Rubber Company suggest that a small particle size aids the dispersion of latex in asphalt. Small particle size latices are also disclosed in U.S. Pat. Nos. 3,835,117 and 3,897,380 issued Sept. 10, 1974 and July 29, 1975 to Walaschek and, U.S. Pat. 4,544,690 issued Oct. 1, 1985 assigned to Reichold Chemicals Inc.

The emulsion of asphalt, bitumen or tar modified with polymer may contain up to 90, most preferably from 50 to 75 weight % solids.

The present invention contemplates two types of destabilization systems. The first destabilizing system comprises an ammonium, or metal silicofluoride used in conjunction with one or more members selected from the group consisting of ammonium sulfamate, ammonium sulfate, $C_{1-8}$, preferably $C_{1-4}$ alkyl and hydroxyalkyl amine sulfamates, $C_{1-8}$, preferably $C_{1-4}$ alkyl and hydroxyalkyl amine sulfates and ammonium salts of $C_{1-6}$ aliphatic carboxylic acids, preferably ammonium acetate.

The silicofluoride is preferably an alkali metal silicofluoride, most preferably sodium silicofluoride. It is used in an amount from at least about 0.1 parts by dry weight per 100 parts weight of solids comprising asphalt and the optional polymer in the emulsion. Preferably, the silicofluoride is used in an amount from about 0.1 to 15, most preferably from 0.1 to 3 parts dry weight per 100 parts dry weight of solids in the emulsion.

The second component, the sulfamate, sulfate or ammonium salt of a $C_{1-6}$ aliphatic carboxylic acid is used in an amount from about 0.05 to 10, preferably 0.1 to 10, most preferably 0.1 to 3, parts dry weight ammonium per 100 parts by dry weight of emulsion. Preferably, the second component is selected from the group consisting of ammonium sulfamate, $C_{1-4}$ alkyl and hydroxyalkyl sulfamates and sulfates, ammonium salts of $C_{1-4}$ aliphatic carboxylic acids, preferably ammonium sulfamates or ammonium acetate.

The second destabilizing system comprises an agent which releases at least 0.05 parts by weight of ammonium ions per 100 parts by dry weight of emulsion. Preferably the agent comprises from about 0.1 to 10, most preferably 0.1 to 5 parts by dry weight of one or more members selected from the group consisting of ammonium salts of $C_{1-16}$ preferably $C_{1-6}$, aliphatic organic acids, and $C_{1-4}$ alkyl and hydroxyalkyl amines and at least about 0.5, preferably at least 3 parts by weight of a material which releases a divalent metal ions. In situations where the divalent metal ion is not supplied from mineral aggregate a divalent metal releasing compound may be added to the emulsion in an amount to provide at least about 0.5, preferably 3 most preferably from 3 to 15 parts of divalent metal ion per 100 parts of emulsion. In applications where the emulsion is applied to aggregate the metal ion content may be supplied from the aggregate rather than being supplied to the emulsion prior to application to the aggregate.

A preferred ammonium salt is ammonium acetate. A preferred amine is ethylamine or ethanolamine.

The above systems may be used in conjunction with from about 0.1 to 10, preferably 0.3 to 5 parts dry weight per 100 parts dry weight of solids in said emulsion of one or more members selected from the group consisting of: ammonium sulfamate, $C_{1-8}$ preferably $C_{1-4}$ alkyl or hydroxyalkyl amine sulfamates, $C_{1-8}$ preferably $C_{1-4}$ alkyl or hydroxyalkyl amine sulfates.

As noted above, in many instances the emulsions of the present invention will be applied to an aggregate. When the emulsion is applied to an aggregate, the divalent metal ions may be provided from the aggregate. In other applications where there is no source of metal ions, they may be added to the emulsion. Particularly preferred divalent metal ions are zinc, cadmium and calcium ions.

When the silicofluoride gelling system is used, the emulsion will be destabilized and break shortly after the addition of the silicofluoride sulfamate to the emulsion. Thus, these systems usually involve a two-step treatment. The asphalt emulsion may be sprayed concurrently with a silicofluoride/sulfamate solution onto a substrate or aggregate or the asphalt may be laid down, then sprayed with the gelling system. It is possible to mix the gelling system with the emulsion immediately prior to its placement. However, great care should be taken with the latter approach as any delay in placing the emulsion may result in it setting in the lines, or even in the emulsion tank.

The second destabilizing system may be applied in a similar manner to the first system. The destabilization will not be too rapid if the emulsion is not exposed to neat or it is not permitted to lose ammonia to the environment. The second system may also be used to provide an emulsion having some pot life.

The following examples are intended to illustrate the invention and not to limit it. In the examples, unless otherwise specified, parts are by dry weight.

EXAMPLE 1

A gelling system was prepared comprising equal parts of ammonium sulfamate and monoethanol amine. This gelling system was prepared as a 70 percent solution. Various amounts of the gelling system were compounded with a latex. The latex was a commercially available styrene butadiene latex sold under the trademark POLYSAR. The latex had a solids content of about 70 percent. The polymer had a bound styrene content of 24 percent.

The resulting "self gel" latex was then added to a commercially available RS-2 anionic asphalt emulsion to provide 3 percent rubber by dry weight in the emulsion. The asphalt emulsion was poured into a stainless steel pan and washed and dried limestone aggregate was embedded into the wet asphalt emulsion.

The time for the asphalt to set was measured by determining when the aggregate would not move when lightly touched. The results of the experiment are set forth in Table 1.

TABLE 1

| | Asphalt Emulsion + 3% Latex | | | |
| --- | --- | --- | --- | --- |
| | Control | A | B | C |
| Gelling Agent per 100 parts of latex | — | 30 | 15 | 7 |
| Set time | 2 hours | less than 2 minutes | 9 min. 15 seconds | 15 minutes |

This example shows that the gelling system in total amount of from 0.9 to about 0.2 part dry weight per 100 parts of weight of emulsion may be used to control the destabilization of latex modified anionic asphalt emulsion from about 2 to 15 minutes as opposed to 2 hours for latex modified asphalt emulsion without the gelling systems of the present invention.

EXAMPLE 2

A series of latex modified anionic asphalt emulsion prepared above where tested for their cohesive strength in accordance with a modified Essai d'Adhesion Globale A La Plaque Vialit of the Laboratoire Central des Ponts et Chaussees (sometimes called the French Chip Test).

In this test two stainless steel plates 200 mm/200 mm/3 mm are coated with 1.5 kg dry/m² asphalt emulsion 100 limestone chips retained on a ⅜" screen are put in the asphalt emulsion and the plates allowed to dry for 24 h at room temperature. Afterwards, one plate is dried for 48 h more at room temperature, while the second plate is aged 48 h in an oven at 60° C. Both plates are then brought to 5° C. by means of a cooling bath. The plates are then inverted on a four point stand and a steel ball (500 g, 50 mm diam.) is then dropped from a 50 cm height to the back of each plate ten times. The percent of limestone chips retained in the asphalt was recorded. In this test, anionic asphalt, the control of Example 1 (i.e modified with 3 percent latex-no gelling agent) and the modified asphalts of runs B and C of Example 1 were used as the asphalt emulsion. The results are presented in Table 2.

TABLE 2

| Asphalt Emulsion | Control No latex No gel | A A from Ex.1 | B B from Ex. 1 | C C from Ex. 1 |
|---|---|---|---|---|
| % limestone chips retained | 0 | 85 | 99 | 99 |

This example demonstrates that latex modified asphalt has improved cohesive strength over unmodified asphalt. The cohesive strength of Latex modified asphalt containing the gelling system of the present invention is not adversely affected by the gelling system.

What is claimed is:

1. A process for destabilizing a polymer modified anionic aqueous emulsion comprising, per 100 parts by weight of bitumen, coal tar or a mixture thereof, from 1 to 50 parts, by dry weight, of a polymer or a latex of a polymer selected from the group consisting of:
    (a) polymers comprising:
        (i) from 80 to 20 weight percent of a $C_{8-12}$ vinyl or vinylidine aromatic monomer which may be unsubstituted or substituted by a $C_{1-4}$ alkyl radical or a chlorine atom; and
        (ii) from 20 to 80 weight percent of a $C_{4-6}$ conjugated diolefin which may be unsubstituted or substituted by a chlorine atom;
said emulsion and said latex, when present, being stabilized with an emulsifier selected from the groups consisting of soaps of $C_{12-18}$ long chain fatty acids, rosin, hydrogenated rosin and tall oil; which comprises contacting, per 100 parts by dry weight, of said emulsion with a destabilization system comprising:
    at least about 0.5 parts, dry weight, of a compound which releases or produces a divalent metal ion and a sufficient amount of a compound selected from the group consisting of ammonium salts of $C_{1-6}$ organic acids, and $C_{1-4}$ alkyl and hydroalkyl amines, to provide at least 0.05 parts, by dry weight, of ammonia or ammonium ion.

2. A process according to claim 1, wherein said divalent metal ion is present in an amount of at least 3 parts, per 100 parts by dry weight of emulsion, and is selected from the group consisting of zinc, cadmium and calcium.

3. A process according to claim 2, wherein said destabilizing system further comprises, per 100 parts by dry weight of said emulsion, from about 0.1 to 10 parts by weight of one or more members selected from the group consisting of ammonium sulfamate, and $C_{1-4}$ alkyl and hydroxyalkyl amine sulfamates.

4. A process according to claim 3, wherein said polymer comprises from about 40 to 60 weight percent of styrene and from 60 to 40 weight percent of butadiene.

5. A process according to claim 1, wherein said destabilizing system comprises equal parts, by dry weight, of monoethanol amine and ammonium sulfamate as a 70 percent aqueous solution and is used in an amount up to 30 parts, by dry weight per 100 parts dry weight of said emulsion, and said zinc, cadmium and calcium is provided by contact with mineral aggregate.

6. A composition for setting anionic emulsions of bitumen, coal tar or mixtures thereof produced by the process of destabilizing said emulsions comprising, from 1 to 50 parts, by dry weight per 100 parts by weight of bitumen, coal tar or mixtures thereof, of a polymer or a latex of a polymer selected from the group consisting of:
    (a) polymers comprising:
        (i) from 80 to.20 weight percent of a $C_{8-12}$ vinyl or vinylidine aromatic monomer which may be substituted or substituted by a $C_{1-4}$ alkyl radical or a chlorine atom; and
        (ii) from 20 to 80 weight percent of a $C_{4-6}$ conjugated diolefin which may be unsubstituted or substituted by a chlorine atom; and
said emulsion and said latex, when present, being stabilized with an emulsifier selected from the group consisting of soaps of $C_{12-18}$ long chain fatty acids, rosin, hydrogenated rosin and tall oil; which comprises contacting, per 100 parts by dry weight of said emulsion, with a destabilization system comprising, at least about 0.5 parts, dry weight, of a compound which releases or produces a divalent metal ion and a sufficient amount of a compound selected from the group consisting of ammonium salts of $C_{1-6}$ organic acids, and $C_{1-4}$ alkyl and hydroxyalkyl amines, to provide at least 0.05 parts, by dry weight, or ammonia or ammonium ion.

* * * * *